(12) United States Patent
Liu et al.

(10) Patent No.: US 12,345,471 B1
(45) Date of Patent: Jul. 1, 2025

(54) CAPACITY EXPANSION METHOD FOR HOUSEHOLD FOOD WASTE DISPOSERS

(71) Applicant: Bigland Electric Appliance Co., Ltd., Guangdong (CN)

(72) Inventors: Zhimin Liu, Dongguan (CN); Dongyuan Lin, Dongguan (CN); Shaoliang Yang, Dongguan (CN); Shuo Huang, Dongguan (CN); Tiejiang Luo, Dongguan (CN)

(73) Assignee: Bigland Electric Appliance Co., Ltd., Dongguan (CN)

( * ) Notice: Subject to any disclaimer, the term of this patent is extended or adjusted under 35 U.S.C. 154(b) by 0 days.

(21) Appl. No.: 19/013,130

(22) Filed: Jan. 8, 2025

(30) Foreign Application Priority Data

Dec. 5, 2024 (CN) .......................... 202411777970.2

(51) Int. Cl.
*F26B 21/10* (2006.01)
*F26B 21/08* (2006.01)

(52) U.S. Cl.
CPC .............. *F26B 21/10* (2013.01); *F26B 21/08* (2013.01); *F26B 2200/02* (2013.01)

(58) Field of Classification Search
CPC ....... F26B 21/10; F26B 21/08; F26B 2200/02
See application file for complete search history.

(56) References Cited

U.S. PATENT DOCUMENTS

| | | | | |
|---|---|---|---|---|
| 2004/0163184 | A1* | 8/2004 | Waldron | D06F 73/02 68/5 R |
| 2024/0017269 | A1* | 1/2024 | Kang | F26B 3/20 |
| 2024/0342775 | A1* | 10/2024 | Lee | F26B 21/10 |

FOREIGN PATENT DOCUMENTS

| | | | |
|---|---|---|---|
| JP | H04246002 | * | 9/1992 |
| KR | 101941620 | * | 1/2019 |

OTHER PUBLICATIONS

Suzuki, Waste display device, 1996, google patents, note this is a machine translation of JPH04246002 (Year: 1996).*
Lee2, Food waste disposal unit with an intermittent dryness, 2019, google patents, note this is a machine translation of KR101941620 (Year: 2019).*

* cited by examiner

*Primary Examiner* — Robert E Fennema
*Assistant Examiner* — Yvonne Trang Follansbee
(74) *Attorney, Agent, or Firm* — Justin Lampel

(57) ABSTRACT

A capacity expansion method for a household food waste disposer includes a detecting step in which after activating a treatment routine, a control unit continuously detects the temperature and relative humidity at a temperature and humidity detection point by a detection element installed at the temperature and humidity detection point and a determination and reminder step in which the control unit calculates and determines whether the detected temperature rise rate is higher than a predetermined threshold, and if the temperature rise rate is not higher than the threshold, users are reminded by an audio-visual reminder to open a lid and add food waste to the disposal drum again, and the control unit continues to run the treatment routine when the lid is closed. In this way, the present disclosure can expand the capacity of the household food waste disposer to more than three times its actual physical capacity.

8 Claims, 4 Drawing Sheets

| Table 1-1 | | | | | | | | | | |
|---|---|---|---|---|---|---|---|---|---|---|
| Pure Water Level Saturation Vapor Pressure Lookup Table (kPa) | | | | | | | | | | |
| t/°C | 0 | 0.1 | 0.2 | 0.3 | 0.4 | 0.5 | 0.6 | 0.7 | 0.8 | 0.9 |
| 0 | 0.611 | 0.615 | 0.62 | 0.624 | 0.629 | 0.633 | 0.638 | 0.642 | 0.647 | 0.652 |
| 1 | 0.657 | 0.661 | 0.666 | 0.671 | 0.676 | 0.681 | 0.685 | 0.690 | 0.695 | 0.7 |
| 2 | 0.705 | 0.711 | 0.716 | 0.721 | 0.726 | 0.731 | 0.736 | 0.742 | 0.747 | 0.752 |
| 3 | 0.758 | 0.763 | 0.768 | 0.774 | 0.779 | 0.785 | 0.79 | 0.796 | 0.802 | 0.807 |
| 4 | 0.813 | 0.819 | 0.825 | 0.83 | 0.836 | 0.842 | 0.848 | 0.854 | 0.86 | 0.866 |
| 5 | 0.872 | 0.878 | 0.884 | 0.891 | 0.897 | 0.903 | 0.909 | 0.916 | 0.922 | 0.928 |
| 6 | 0.935 | 0.941 | 0.948 | 0.955 | 0.961 | 0.968 | 0.974 | 0.981 | 0.988 | 0.955 |
| 7 | 1.002 | 1.009 | 1.016 | 1.022 | 1.03 | 1.037 | 1.044 | 1.051 | 1.058 | 1.065 |
| 8 | 1.073 | 1.08 | 1.087 | 1.095 | 1.102 | 1.11 | 1.117 | 1.125 | 1.132 | 1.14 |
| 9 | 1.148 | 1.156 | 1.164 | 1.171 | 1.179 | 1.187 | 1.195 | 1.203 | 1.212 | 1.22 |
| 10 | 1.228 | 1.236 | 1.244 | 1.253 | 1.261 | 1.27 | 1.278 | 1.287 | 1.295 | 1.304 |
| 11 | 1.313 | 1.321 | 1.33 | 1.339 | 1.348 | 1.357 | 1.366 | 1.375 | 1.384 | 1.393 |
| 12 | 1.403 | 1.412 | 1.421 | 1.431 | 1.44 | 1.45 | 1.459 | 1.469 | 1.478 | 1.488 |
| 13 | 1.498 | 1.508 | 1.518 | 1.528 | 1.538 | 1.548 | 1.558 | 1.568 | 1.578 | 1.588 |
| 14 | 1.599 | 1.069 | 1.62 | 1.63 | 1.641 | 1.652 | 1.662 | 1.673 | 1.684 | 1.695 |
| 15 | 1.706 | 1.717 | 1.728 | 1.739 | 1.75 | 1.761 | 1.773 | 1.784 | 1.796 | 1.807 |
| 16 | 1.819 | 1.83 | 1.842 | 1.854 | 1.866 | 1.878 | 1.89 | 1.902 | 1.914 | 1.926 |
| 17 | 1.938 | 1.951 | 1.963 | 1.976 | 1.988 | 2.001 | 2.013 | 2.026 | 2.039 | 2.052 |
| 18 | 2.065 | 2.078 | 2.091 | 2.104 | 2.117 | 2.131 | 2.144 | 2.158 | 2.171 | 2.185 |
| 19 | 2.198 | 2.212 | 2.226 | 2.24 | 2.254 | 2.268 | 2.282 | 2.296 | 2.311 | 2.325 |
| 20 | 2.339 | 2.354 | 2.369 | 2.383 | 2.398 | 2.413 | 2.428 | 2.443 | 2.485 | 2.473 |
| 21 | 2.488 | 2.504 | 2.519 | 2.535 | 2.55 | 2.566 | 2.582 | 2.598 | 2.614 | 2.63 |
| 22 | 2.646 | 2.662 | 2.678 | 2.694 | 2.711 | 2.727 | 2.744 | 2.761 | 2.778 | 2.794 |
| 23 | 2.811 | 2.828 | 2.846 | 2.863 | 2.88 | 2.898 | 2.915 | 2.933 | 2.95 | 2.968 |
| 24 | 2.986 | 3.004 | 3.022 | 3.04 | 3.059 | 3.077 | 3.096 | 3.114 | 3.133 | 3.152 |
| 25 | 3.17 | 3.189 | 3.208 | 3.228 | 3.247 | 3.266 | 3.286 | 3.305 | 3.325 | 3.345 |

FIG. 1-1

| Table 1-2 (continued from the above table) | | | | | | | | | | |
|---|---|---|---|---|---|---|---|---|---|---|
| Pure Water Level Saturation Vapor Pressure Lookup Table (kPa) | | | | | | | | | | |
| t/°C | 0 | 0.1 | 0.2 | 0.3 | 0.4 | 0.5 | 0.6 | 0.7 | 0.8 | 0.9 |
| 26 | 3.364 | 3.384 | 3.404 | 3.425 | 3.445 | 3.465 | 3.486 | 3.506 | 3.527 | 3.548 |
| 27 | 3.569 | 3.59 | 3.611 | 3.632 | 3.653 | 3.675 | 3.696 | 3.718 | 3.74 | 3.762 |
| 28 | 3.784 | 3.806 | 3.828 | 3.85 | 3.873 | 3.895 | 3.918 | 3.941 | 3.964 | 3.987 |
| 29 | 4.01 | 4.033 | 4.056 | 4.08 | 4.103 | 4.127 | 4.151 | 4.175 | 4.199 | 4.223 |
| 30 | 4.248 | 4.272 | 4.297 | 4.321 | 4.346 | 4.371 | 4.396 | 4.421 | 4.447 | 4.472 |
| 31 | 4.498 | 4.523 | 4.549 | 4.575 | 4.601 | 4.627 | 4.654 | 4.68 | 4.707 | 4.733 |
| 32 | 4.76 | 4.787 | 4.814 | 4.842 | 4.869 | 4.897 | 4.924 | 4.952 | 4.98 | 5.008 |
| 33 | 5.036 | 5.046 | 5.093 | 5.122 | 5.15 | 5.179 | 5.208 | 5.237 | 5.267 | 5.296 |
| 34 | 5.326 | 5.356 | 5.385 | 5.415 | 5.446 | 5.476 | 5.506 | 5.537 | 5.568 | 5.599 |
| 35 | 5.63 | 5.661 | 5.692 | 5.724 | 5.755 | 5.787 | 5.819 | 5.851 | 5.884 | 5.916 |
| 36 | 5.949 | 5.981 | 6.014 | 6.047 | 6.08 | 6.114 | 6.147 | 6.181 | 6.215 | 6.249 |
| 37 | 6.283 | 6.317 | 6.352 | 6.386 | 6.421 | 6.456 | 6.491 | 6.527 | 6.562 | 6.598 |
| 38 | 6.633 | 6.669 | 6.706 | 6.742 | 6.778 | 6.815 | 6.852 | 6.889 | 6.926 | 6.963 |
| 39 | 7.001 | 7.038 | 7.076 | 7.114 | 7.153 | 7.191 | 7.229 | 7.268 | 7.307 | 7.346 |
| 40 | 7.385 | 7.425 | 7.465 | 7.504 | 7.544 | 7.585 | 7.625 | -7.666 | 7.706 | 7.747 |
| 41 | 7.788 | 7.83 | 7.871 | 7.913 | 7.955 | 7.997 | 8.039 | 8.081 | 8.124 | 8.167 |
| 42 | 8.21 | 8.253 | 8.297 | 8.34 | 8.384 | 8.428 | 8.472 | 8.517 | 8.561 | 8.606 |
| 43 | 8.651 | 8.696 | 8.742 | 8.787 | 8.833 | 8.879 | 8.925 | 8.972 | 9.019 | 9.065 |
| 44 | 9.112 | 9.16 | 9.207 | 9.255 | 9.303 | 9.351 | 9.399 | 9.448 | 9.497 | 9.546 |
| 45 | 9.595 | 9.644 | 9.694 | 9.744 | 9.794 | 9.844 | 9.895 | 9.946 | 9.997 | 10.048 |
| 46 | 10.099 | 10.151 | 10.203 | 10.255 | 10.307 | 10.36 | 10.413 | 10.466 | 10.519 | 10.572 |
| 47 | 10.626 | 10.68 | 10.734 | 10.789 | 10.843 | 10.898 | 10.953 | 11.009 | 11.064 | 11.12 |
| 48 | 11.176 | 11.233 | 11.289 | 11.346 | 11.403 | 11.461 | 11.518 | 11.576 | 11.634 | 11.692 |
| 49 | 11.751 | 11.81 | 11.869 | 11.928 | 11.988 | 12.048 | 12.108 | 12.168 | 12.229 | 12.29 |
| 50 | 12.351 | 12.412 | 12.474 | 12.536 | 12.598 | 12.66 | 12.723 | 12.786 | 12.849 | 12.913 |

FIG. 1-2

| Table 1-3 (continued from the above table) | | | | | | | | | | |
|---|---|---|---|---|---|---|---|---|---|---|
| Pure Water Level Saturation Vapor Pressure Lookup Table (kPa) | | | | | | | | | | |
| t/°C | 0 | 0.1 | 0.2 | 0.3 | 0.4 | 0.5 | 0.6 | 0.7 | 0.8 | 0.9 |
| 51 | 12.977 | 13.041 | 13.105 | 13.169 | 13.234 | 13.299 | 13.365 | 13.431 | 13.497 | 13.563 |
| 52 | 13.629 | 13.696 | 13.763 | 13.83 | 13.898 | 13.966 | 14.034 | 14.103 | 14.172 | 14.241 |
| 53 | 14.31 | 14.38 | 14.45 | 14.52 | 14.59 | 14.661 | 14.732 | 14.804 | 14.875 | 14.947 |
| 54 | 15.019 | 15.092 | 15.165 | 15.238 | 15.312 | 15.385 | 15.459 | 15.534 | 15.609 | 15.684 |
| 55 | 15.759 | 15.835 | 15.91 | 15.987 | 16.063 | 16.14 | 16.217 | 16.295 | 16.373 | 16.45 |
| 56 | 16.529 | 16.608 | 16.687 | 16.766 | 16.846 | 16.926 | 17.007 | 17.087 | 17.168 | 17.25 |
| 57 | 17.331 | 17.413 | 17.496 | 17.578 | 17.661 | 17.745 | 17.828 | 17.913 | 17.997 | 18.082 |
| 58 | 18.167 | 18.252 | 18.338 | 18.424 | 18.51 | 18.597 | 18.684 | 18.771 | 18.859 | 18.947 |
| 59 | 19.036 | 19.125 | 19.214 | 19.303 | 19.393 | 19.484 | 19.574 | 19.665 | 19.757 | 19.848 |
| 60 | 19.94 | 20.033 | 20.126 | 20.219 | 20.312 | 20.406 | 20.5 | 20.595 | 20.69 | 20.785 |
| 61 | 20.881 | 20.977 | 21.074 | 21.171 | 21.268 | 21.365 | 21.463 | 21.562 | 21.661 | 21.76 |
| 62 | 21.859 | 21.959 | 22.06 | 22.16 | 22.261 | 22.363 | 22.465 | 22.567 | 22.67 | 22.773 |
| 63 | 22.876 | 22.98 | 23.084 | 23.189 | 23.294 | 23.4 | 23.506 | 23.612 | 23.719 | 23.826 |
| 64 | 23.933 | 24.041 | 24.149 | 24.258 | 24.367 | 24.477 | 24.587 | 24.697 | 24.808 | 24.92 |
| 65 | 25.031 | 25.143 | 25.256 | 25.369 | 25.482 | 25.596 | 25.71 | 25.825 | 25.94 | 26.056 |
| 66 | 26.172 | 26.288 | 26.405 | 26.522 | 26.64 | 26.758 | 26.877 | 26.996 | 27.116 | 27.236 |
| 67 | 27.356 | 27.477 | 27.598 | 27.72 | 27.842 | 27.965 | 28.088 | 28.212 | 28.336 | 28.46 |
| 68 | 28.585 | 28.711 | 28.837 | 28.963 | 29.09 | 29.217 | 29.345 | 29.474 | 29.602 | 29.732 |
| 69 | 29.861 | 29.991 | 30.122 | 30.253 | 30.385 | 30.517 | 30.65 | 30.783 | 30.916 | 31.05 |
| 70 | 31.185 | 31.32 | 31.456 | 31.592 | 31.728 | 31.865 | 32.003 | 32.141 | 32.279 | 32.418 |
| 71 | 32.558 | 32.698 | 32.839 | 32.98 | 33.121 | 33.263 | 33.406 | 33.549 | 33.693 | 33.837 |
| 72 | 33.982 | 34.127 | 34.273 | 34.419 | 34.566 | 34.713 | 34.861 | 35.009 | 35.158 | 35.308 |
| 73 | 35.457 | 35.608 | 35.759 | 35.911 | 36.063 | 36.216 | 36.369 | 36.523 | 36.677 | 36.832 |
| 74 | 36.987 | 37.143 | 37.3 | 37.457 | 37.614 | 37.773 | 37.931 | 38.091 | 38.251 | 38.411 |
| 75 | 38.572 | 38.734 | 38.896 | 39.058 | 39.222 | 39.386 | 39.55 | 39.715 | 39.881 | 40.047 |

FIG. 1-3

| Table 1-4 (continued from the above table) | | | | | | | | | | |
|---|---|---|---|---|---|---|---|---|---|---|
| Pure Water Level Saturation Vapor Pressure Lookup Table (kPa) | | | | | | | | | | |
| t/°C | 0 | 0.1 | 0.2 | 0.3 | 0.4 | 0.5 | 0.6 | 0.7 | 0.8 | 0.9 |
| 76 | 40.214 | 40.381 | 40.549 | 40.718 | 40.887 | 41.056 | 41.227 | 41.398 | 41.569 | 41.741 |
| 77 | 41.914 | 42.087 | 42.261 | 42.436 | 42.611 | 42.786 | 42.963 | 43.14 | 43.317 | 43.495 |
| 78 | 43.674 | 43.854 | 44.034 | 44.214 | 44.396 | 44.577 | 44.76 | 44.943 | 45.127 | 45.311 |
| 79 | 45.496 | 45.682 | 45.868 | 46.055 | 46.243 | 46.431 | 46.62 | 46.809 | 46.999 | 47.19 |
| 80 | 47.382 | 47.574 | 47.767 | 47.96 | 48.154 | 48.349 | 48.544 | 48.74 | 48.937 | 49.134 |
| 81 | 49.332 | 49.531 | 49.731 | 49.931 | 50.131 | 50.333 | 50.535 | 50.738 | 50.941 | 51.145 |
| 82 | 51.35 | 51.556 | 51.762 | 51.969 | 52.176 | 52.385 | 52.594 | 52.803 | 53.014 | 53.225 |
| 83 | 53.436 | 53.649 | 53.862 | 54.076 | 54.291 | 54.506 | 54.722 | 54.939 | 55.156 | 55.374 |
| 84 | 55.593 | 55.813 | 56.033 | 56.254 | 56.476 | 56.699 | 56.922 | 57.146 | 57.371 | 57.596 |
| 85 | 57.823 | 58.05 | 58.278 | 58.506 | 58.735 | 58.965 | 59.196 | 59.427 | 59.66 | 59.893 |
| 86 | 60.126 | 60.361 | 60.596 | 60.832 | 61.069 | 61.307 | 61.545 | 61.784 | 62.024 | 62.265 |
| 87 | 62.506 | 62.749 | 62.992 | 63.236 | 63.48 | 63.726 | 63.972 | 64.219 | 64.467 | 64.715 |
| 88 | 64.965 | 65.215 | 65.466 | 65.718 | 65.97 | 66.224 | 66.478 | 66.733 | 66.989 | 67.245 |
| 89 | 67.503 | 67.761 | 68.021 | 68.28 | 68.541 | 68.803 | 69.065 | 69.329 | 69.593 | 69.858 |
| 90 | 70.124 | 70.39 | 70.658 | 70.926 | 71.195 | 71.465 | 71.736 | 72.008 | 72.281 | 72.554 |
| 91 | 72.829 | 73.104 | 73.38 | 73.657 | 73.935 | 74.213 | 74.493 | 74.773 | 75.055 | 75.337 |
| 92 | 75.62 | 75.904 | 76.189 | 76.474 | 76.761 | 77.049 | 77.337 | 77.626 | 77.917 | 78.208 |
| 93 | 78.5 | 78.793 | 79.087 | 79.381 | 79.677 | 79.974 | 80.271 | 80.570 | 80.869 | 81.169 |
| 94 | 81.47 | 81.773 | 82.076 | 82.38 | 82.685 | 82.990 | 83.297 | 83.605 | 83.914 | 84.223 |
| 95 | 84.534 | 84.845 | 85.158 | 85.471 | 85.786 | 86.101 | 86.418 | 86.735 | 87.053 | 87.372 |
| 96 | 87.693 | 88.014 | 88.336 | 88.659 | 88.983 | 89.308 | 89.634 | 89.961 | 90.289 | 90.618 |
| 97 | 90.949 | 91.28 | 91.612 | 91.945 | 92.279 | 92.614 | 92.95 | 93.287 | 93.625 | 93.964 |
| 98 | 94.304 | 94.645 | 94.988 | 95.331 | 95.675 | 96.02 | 96.367 | 96.714 | 97.062 | 97.412 |
| 99 | 97.762 | 98.114 | 98.466 | 98.820 | 99.174 | 99.53 | 99.887 | 100.245 | 100.603 | 100.963 |
| 100 | 101.324 | 101.686 | 102.049 | 102.414 | 102.779 | 103.145 | 103.513 | 103.881 | 104.251 | 104.621 |

FIG. 1-4

CAPACITY EXPANSION METHOD FOR HOUSEHOLD FOOD WASTE DISPOSERS

TECHNICAL FIELD OF THE DISCLOSURE

The present disclosure relates to the technical field of household food waste disposer control systems, and more particularly to a capacity expansion method for household food waste disposers.

BACKGROUND OF THE DISCLOSURE

Household food waste disposer is used for fermenting, drying and converting food waste into fertilizer. During the use of the household food waste disposer, food waste is filled into a disposal drum of the household food waste disposer first, and then a disposal routine of the household food waste disposer is activated, and the household food waste disposer is operated according to the procedure set in the disposal routine without interruption. The household food waste disposer operates from the start to the end of all steps and eventually shuts down automatically, and it takes a relatively long time for the cycle from the start to the end of the waste disposal process. Once the food waste disposer starts its operation procedure, the continuous operation time is often more than a few hours, or even more than 20 hours.

In a treatment mode of the household food waste disposer, the maximum amount of food waste to be disposed of in a single operation is limited by the actual physical capacity of the disposal drum. For general household users, the use of a large-capacity household food waste disposer with a capacity of 5 liters or more is sufficient for daily use, however, the large-capacity household food waste disposers are expensive and bulky and not suitable for placement in kitchens.

Therefore, how to increase the waste disposal capacity of the household food waste disposer remains to be studied.

SUMMARY OF THE DISCLOSURE

In view of the deficiencies of the related art, the present disclosure aims to provide a capacity expansion method for household food waste disposers that increases the capacity of the household food waste disposers as well as the handling amount of food waste.

In order to realize the above purpose, the present disclosure adopts a technical solution to provide a capacity expansion method for household food waste disposers in accordance with the present disclosure, and the method includes the following steps.

Starting Step: In this step, after a user closes the lid of a household food waste disposer, a control unit starts a treatment routine, and the household food waste disposer uses a heating element to start heating up a disposal drum which is used for collecting and storing food waste and to start the treatment routine of food waste.

Detecting Step: After the treatment routine is started, the control unit continuously detects and records the temperature and relative humidity at a temperature and humidity detection point by means of a detection element located at the temperature and humidity detection point of the food waste disposer.

Determination and Reminder Step: The control unit calculates and determines whether or not the temperature rise rate of the detected temperature is higher than a predetermined threshold; and when the temperature rise rate is not higher than the predetermined threshold, it is determined that the control unit has completed an initial warming stage and the control unit will send out a waste addition reminder signal to remind the user by means of an audible/visual reminder to open the lid of the household food waste disposer and add food waste to the disposal drum again.

Waste Addition Step: The control unit suspends the treatment routine to provide the user with an opportunity to add food waste to the disposal drum, after the control unit sends out a waste addition reminder signal and receives an open-lid signal indicating that the lid has been opened or a control signal for adding food waste, and continues the operation of the treatment routine after the control unit receives a closed-lid signal indicating that the lid has been closed or a control signal for continuing the operation of the treatment routine.

Compared with the existing technologies, the present disclosure has the following advantages. This disclosure provides users with the ability to re-fill food waste into the disposal drum at an appropriate time during the treatment routine, and the ability to add food waste to the disposal drum several times, increasing the capacity of waste capacity of the household food waste disposer as well as the handling amount of food waste.

The present disclosure can expand the capacity of the household food waste disposer to more than three times of its actual physical capacity, so the small-capacity household food waste disposer has the capacity to dispose of large-capacity waste.

BRIEF DESCRIPTION OF THE DRAWINGS

FIGS. 1-1 to 1-4 show a table of pressure values for saturated water vapor corresponding to different temperatures at one atmospheric pressure.

DESCRIPTION OF THE PREFERRED EMBODIMENTS

The present disclosure discloses a capacity expansion method for a household food waste disposer, and the method includes the following steps:

Starting Step: After a user closes a lid of the household food waste disposer, a control unit starts a treatment routine, and the household food waste disposer uses a heating element to start heating a disposal drum which is used for collecting and storing food waste and starts the treatment of food waste. The heating element consists of a heating plate located under the disposal drum.

Determination and Reminder Step: After the activation of the treatment routine, the control unit continuously detects the temperature and relative humidity of a temperature and humidity detection point by means of a detection element located at the temperature and humidity detection point of the food waste disposer, which is located in a collection chamber or an air duct of the food waste disposer used for exhausting airflow.

After the initial warming stage is completed, the control unit calculates and determines whether or not the temperature rise rate of the detected temperature is higher than the predetermined threshold; if the temperature rise rate is higher than the predetermined threshold, the control unit will maintain the normal operation of the treatment; and if the temperature rise rate is not higher than the predetermined threshold, the control unit will determine whether an initial warming stage has been completed and will send out a reminder to remind the user by means of an audible/visual reminder to add waste to the disposal drum.

The control unit continuously calculates the temperature rise rate based on the detected temperature and performs a logically determination according to the temperature rise rate, as described below.

When the temperature rise rate is greater than 2° C. in three minutes, it is determined that the household food waste disposer has not completed the initial warming stage, and the current operating status is maintained and the temperature rise rate is continuously detected and calculated.

When the temperature rise rate is less than or equal to 2° C. in three minutes, it is determined that the household food waste disposer has completed the initial warming stage, and the control unit sends out an instruction or alarm to remind the user to add waste.

Wherein, the control unit records the detected temperature continuously or at intervals, and three minutes after the first recording of the temperature, the control unit compares the temperature difference between the current detected temperature and the temperature detected three minutes earlier, and if the temperature difference is greater than 2° C., then it is determined that the household food waste disposer has not completed the initial warming stage, and if the temperature difference is less than or equal to 2° C., then it is determined that the household food waste disposer has completed the initial warming stage.

Waste Addition Step: After the control unit sends out a reminder signal to remind the user to add waste and receives an open-lid signal indicating that the lid is opened or a control signal for adding waste, the control unit suspends the treatment routine to provide the user with a time to add waste and continues to run the treatment routine after the control unit receives a lid-close signal or a control signal for continuing the operation of the treatment routine, the control unit repeat the determination and reminder step and the waste addition step to provide the user an opportunity to add the disposal drum again.

The control unit calculates and determines whether the current treatment stage is completed based on the temperature and relative humidity detected at the temperature and humidity detection point, and in the event that the control unit determines that the current treatment stage has been completed, the control unit executes a subroutine that corresponds to the next treatment stage and sends a reminder signal by means of an audible/visual reminder to indicate that the treatment stage has been completed and the current treatment stage.

The audible/visual reminder includes a light alarm, a text, symbol or information alarm, a voice alarm, or a buzzer alarm.

For example, the household food waste disposer is equipped with indicator lamps that indicate the initial warming stage, evaporation stage, drying stage, temperature maintaining stage, and cooling stage respectively.

The indication method of the indicator lamps includes:
1. A lighting or blinking of the indicator lamps controlled by the control unit, which indicates the completed treatment stage.
2. A lighting or blinking of the indicator lamps controlled by the control unit which indicates the current treatment stage.
3. A plurality of colors of the lighting or blinking of the indicator lamps controlled by the control unit, which is used to remind the user to open the lid and add waste to the disposal drum again.

The implementation is further described below in conjunction with specific embodiments.

In the process of treating food waste by the household food waste disposer, the intracellular water is lost, the fiber is softened, and the volume is decreased after the food waste is heated, and the decrease in volume of the food waste mostly occurs in the initial heating stage, and the volume of the food waste in the disposal drum decreases significantly after the completion of the initial warming stage of the household food waste disposer, this is the best time to add more waste, because the food waste in the disposal drum has been reduced to about 25% of the original volume, generally reduced to 20-30% of the original volume), depending on the type of waste.

After the household food waste disposer reminds the user by an audible/visual reminder to open the lid and add waste to the disposal drum again, it is up to the user to decide whether to add waste or not, and then the lid is opened and closed to resume the programmed operation. If there is no detection of the user's action of opening and closing the lid, the treatment routine will not be suspended, but the treatment routine will keep running normally until the all the programs have been executed, and all the waste disposal processes have been completed.

The treatment routine continues to run after new waste is added, the disposal drum continues to be heated to stabilize the temperature inside the disposal drum, the volume of the newly added waste will be reduced to 20-30% of the original volume, the control unit repeats the execution of the determination and reminder step and the waste addition step, and new waste can be added again up to the maximum scale of the disposal drum until there is no more available space inside the disposal drum, providing the user with repeated opportunities and reminders to add waste, thereby realizing the purpose of increasing the disposal capacity of the household food waste disposer. The present disclosure expands the capacity of the household food waste disposer to more than three times its actual physical capacity, so that the small-capacity household food waste disposer has the ability to dispose of large-capacity waste.

A household food waste disposer treats food waste in stages sequentially including an initial warming stage, an evaporation stage, a drying stage, a temperature maintaining stage, and a cooling stage; the treatment routine includes an initial warming subroutine that corresponds to the initial warming stage, an evaporation subroutine that corresponds to the evaporation stage, a drying subroutine that corresponds to the drying stage, a temperature maintaining subroutine that corresponds to the temperature maintaining stage, and a cooling subroutine that corresponds to the cooling stage. The control unit sequentially executes the initial warming subroutine, the evaporation subroutine, the drying subroutine, the temperature maintaining subroutine, and the cooling subroutine.

The first stage is the initial warming stage.

During the initial warming stage, the first indicator lamp which is white in color is on, and the other indicator lamps are not on.

The initial warming stage is the stage of activating the heating element to heat the disposal drum, and the initial warming stage includes the process of the temperature rise at the bottom of the disposal drum from room temperature, until water in the waste is released, and the temperature rise of the liquid at the bottom of the disposal drum to a maximum or even to a boiling point.

After the treatment routine starts running and after the initial warming, the water inside the waste is slowly released, liquid-state water begins to appear at the bottom of the disposal drum, and then the space and air ducts inside the entire disposal drum will gradually become stable and reach a thermal equilibrium, and at this time, the volume of waste inside the disposal drum is obviously reduced;

In the heating method in the initial warming stage, after the waste disposer is turned on, the control unit controls the heating element to continuously heat up to 150° C., and to stop heating at the temperature greater than 165° C., so as to control the temperature of the heating element within 150-165° C. For example, the control unit cyclically controls the heating plate to be electrically conducted for heating for 40 seconds and then disconnected for 20 seconds to keep the temperature within the range of 150-165° C.

In the method of determining the completion of the initial warming stage, it determines whether a thermal equilibrium is reached to confirm whether the temperature of the temperature and humidity detection point in the air duct is stable, in order to determine the completion of the initial warming stage. If the temperature rise rate within three minutes is smaller than or equal to 2° C., the disposal drum will be considered to have reached thermal equilibrium. In the initial warming stage, the temperature of the air duct is generally designed to be around 55° C., and the detected temperature value varies with different structures. If the temperature rise rate within three minutes is smaller than or equal to 2° C., the household food waste disposer will be considered to have completed the initial warming stage and it will switch to the evaporation stage.

The second stage is the evaporation stage.

After switching to the evaporation stage, the first indicator lamp goes out, and the second indicator lamp flashes a blue light, indicating that the first stage has been completed and switched to the second stage, and at the same time, the buzzer sounds several times to indicate that the user can add waste.

After the initial warming stage, the volume of the waste in the disposal drum has reduced significantly (to 20-30% of the original volume), and there is more free space in the disposal drum, so that the best time to add waste to the disposal drum again is during the evaporation stage, and multiple additions of waste can be made.

Specifically, the treatment routine is suspended after the lid is opened, and the treatment routine continues to run after the waste is added and the lid is closed. After the addition of waste, the temperature of the detection point in the air duct will first drop and then rise, and when the temperature of the detection point become stable again, the buzzer will sound again to remind the user to add more food waste, and so on, until the user no longer adds more waste, or the content inside the disposal drum is full and cannot be added anymore, the evaporation subroutine will continue to run until the end of evaporation stage.

The evaporation stage is the stage in which the liquid at the bottom of the disposal drum is stable at a maximum temperature or is in a boiling state. It is determined that the control unit has entered the evaporation stage after a thermal equilibrium has been reached in the disposal drum.

In the heating method used in the evaporation stage, after entering the evaporation stage; the control unit continues to control the heating element intermittently and control the temperature of the heating element to 150-165° C. For example, in the temperature range of 150-165° C. the control unit cyclically controls the heating plate to be electrically conducted to heat the heating element for 40 seconds and then disconnected for 20 seconds.

In the method of determining the completion of evaporation stage, when the detected humidity is smaller than or equal to 60%, it is determined that the control unit has completed the evaporation stage and switched to the drying stage.

The third stage is the drying stage.

In this stage, after the switching to the drying stage, the second indicator lamp is out and the third indicator lamp is on.

When it is determined that the control unit has completed the evaporation stage and switched to the drying stage, the control unit sends out a waste addition reminder signal again and performs the step of adding waste at the same time, and reminds the user to open the lid and add waste to the disposal drum again through an audible/visual reminder. When it is determined that the control unit has entered the drying stage, the control unit sends out an instruction of adding waste by means of an audible/visual alarm, and at the same time, the third indicator lamp flashes a blue light to remind the user that it is a suitable time to add waste to the disposal drum again and executing the step of adding waste at the same time when it is appropriate to add waste. If it is confirmed that no waste will be added in this time, the control unit controls the heating plate to heat up the disposal drum intermittently, and the third indicator lamp turns to a steady white light. The switching to the drying stage is also a suitable time to add waste again. It is recommended to add food waste such as vegetable waste and fruit wastes that are not easily clumped, so as to avoid a long treatment time due to the relatively low average heating power of the treatment stage After drying, the waste that is not easily clumped is processed according to the original sub-program operation, and the humidity of such waste first increases and then decreases, and it does not affect the normal operation, including the determination of heating and drying.

In the heating method in the drying stage, after entering the drying stage, the control unit continues to control the heating element to heat intermittently, and continues the heating when the temperature of the heating element is lower than 130° C., and stops heating when the temperature is higher than 145° C., so that the temperature of the heating element is controlled in the range of 130-145° C. For example, the control unit cyclically controls the heating plate to be electrically conducted for heating for 30 seconds and disconnected for 30 seconds in the temperature range of 130-145° C.

The drying stage is the stage after the liquid in the bottom of the disposal drum has been evaporated, the liquid-state water in the bottom of the disposal drum has been evaporated, and the water remained in the content has been significantly reduced. The average heating power of the drying stage is adjusted to be lower, to prevent the temperature of the bottom of the disposal drum from rising to a too high level due to the decrease of evaporation and the decrease of heat exchange.

In the method of determining the completion of the drying stage, the control unit is determined to have completed the drying stage and switched to the temperature maintaining stage, when the temperature detected at the temperature and humidity point is greater than 75° C. (the temperature threshold is adjusted according to the structure). When the temperature at the detection point of in the air duct rises to 75° C., it indicates that the water content of the content inside the disposal drum is very low, the evaporation is very low, and the airflow temperature rises.

The fourth stage is the temperature maintaining stage.

In this stage, after the switching to the temperature maintaining stage, the third indicator lamp is off, and the fourth indicator lamp with a white light is on.

In the heating method in the temperature maintaining stage, after entering the temperature maintaining stage, the control unit continues to control the heating element to heat intermittently, starts continuous heating when the temperature at the temperature and humidity detection point is lower than 65° C., and stops heating when the temperature at the temperature and humidity detection point reaches 75° C. (the temperature threshold is adjusted according to the structure). For example, in the temperature range of 65-75° C. the control unit cyclically controls the heating plate to be electrically conducted for heating for 20 seconds and then disconnected for 40 seconds.

In the temperature maintaining stage, the water content in the waste in the disposal drum has been reduced to a very low level, i.e., the water content in the content in the disposal drum is very low. Since the evaporation and the evaporation rate are further reduced, the temperature in the disposal drum is more sensitive to the heat provided by the heating plate, so it is necessary to reduce the average power again in order to avoid a rapid increase in the temperature inside the disposal drum, and the purpose of this stage is to better control the temperature in the bottom of the drum and the air duct, to ensure that the contents do not burn and char, and to avoid wasting energy.

In the method of determining the completion of the drying stage, the control unit has a saturated water vapor pressure-temperature comparison table stored in the control unit for the drying determination during the temperature maintaining stage. The saturated water vapor pressure-temperature comparison table provides the saturated water vapor pressure values corresponding to different temperatures at one atmospheric pressure, as shown in FIGS. 1-1 to 1-4.

After the activation of the treatment routine, the control unit records the temperature $T_0$ and the relative humidity $U_0$ at the beginning of drying when the heating element is activated to start drying.

The target humidity $U_b$ is calculated and obtained after the detected current relative humidity $U_1$ has dropped 40-80% and the current detected temperature $T_1$ has stabilized, or preferably after the detected current relative humidity $U_1$ falls below 50% or below 60% and the current detected temperature $T_1$ has stabilized. The control unit obtains the saturated water vapor pressure $ec_0$ corresponding to the temperature $T_0$ and the saturated water vapor pressure $ec_1$ corresponding to the temperature $T_1$, which can be looked up from a saturated water vapor pressure-temperature comparison table. The target humidity $U_b$ can be calculated according to the following equation.

$$U_b = ec_0/ec_1 * U_0 + a, \text{ where } a \text{ is } 1\text{-}10\%,$$

When the current detected relative humidity is less than or equal to the target humidity value $U_b$, the drying step is stopped, and at this time, the waste in the disposal drum is already situated at a drying state and the control unit is determined to have completed the temperature maintaining stage and switched to the cooling stage.

The fifth stage is the cooling stage.

In this stage, after the switching to the cooling stage, the fourth indictor light is off, and the fifth indicator lamp with a white light is on.

After entering the cooling stage, the control unit controls the heating element to stop heating and shut down after a predetermined time, that is, the heating plate stops working, the control unit shuts down after a 30-minute countdown, and the entire treatment routine is completed, and all the indicator lamps are turned off.

What is claimed is:

1. A capacity expansion method for a household food waste disposer, comprising:
    a starting step, in which after a user closes a lid of the household food waste disposer, a control unit starts a treatment routine, uses a heating element to start heating a disposal drum which is used for collecting and storing food waste, and starts the treatment of the food waste;
    a detecting step, in which the control unit continuously detects and records the temperature and relative humidity at a temperature and humidity detection point by means of a detection element located at the temperature and humidity detection point of the food waste disposer, after the treatment routine is started;
    a determination and reminder step, in which the control unit calculates and determines whether a temperature rise rate of the detected temperature is not higher than a predetermined threshold; and if the temperature rise rate is not higher than the predetermined threshold, the control unit will determine that an initial warming stage has been completed and will send out a waste addition reminder signal to remind the user by means of an audible/visual reminder to open the lid of the household food waste disposer and add food waste to the disposal drum again; and
    a waste addition step, in which the control unit suspends the treatment routine to provide the user with an opportunity to add food waste to the disposal drum, after the control unit sends out a waste addition reminder signal and receives an open-lid signal indicating that the lid has been opened or a control signal for adding food waste, and continues the operation of the treatment routine after the control unit receives a closed-lid signal indicating that the lid has been closed or a control signal for continuing the operation of the treatment routine;
    wherein the household food waste disposer treats the food waste in stages sequentially comprising an initial warming stage, an evaporation stage, a drying stage, a temperature maintaining stage, and a cooling stage;
    the treatment routine the treatment routine comprises an initial warming subroutine corresponding to the initial warming stage, an evaporation subroutine corresponding to the evaporation stage, a drying subroutine corresponding to the drying stage, a temperature maintaining subroutine corresponding to the temperature maintaining stage, and a cooling subroutine corresponding to the cooling stage;
    the control unit sequentially executes the initial warming subroutine, the evaporation subroutine, the drying subroutine, the temperature maintaining subroutine, and the cooling subroutine according to the advancement of the treatment stage;
    the control unit calculates and determines whether the current treatment stage is completed based on the temperature and relative humidity detected at the temperature and humidity detection point, and when the control unit determines that the current treatment stage has been completed, the control unit executes a subroutine that corresponds to the next treatment stage and sends a reminder signal by means of an audible/visual reminder to remind the completed treatment stage and/or the current treatment stage; and the audible/visual reminder comprises a light alarm, a text, symbol or information alarm, a voice alarm, or a buzzer alarm;

wherein the control unit comprises a saturated water vapor pressure-temperature comparison table stored therein;

the saturated water vapor pressure-temperature comparison table provides a plurality of saturated water vapor pressure values corresponding to different temperatures at one atmospheric pressure respectively;

after the activation of the treatment routine, the control unit records the temperature $T_0$ and the relative humidity $U_0$ at the beginning of drying when the heating element is activated to start drying;

the target humidity $U_b$ is calculated and obtained by the equation below in the temperature maintaining stage after the detected current relative humidity $U_1$ has dropped 40-80% and the current detected temperature $T_1$ has stabilized, the control unit obtains the saturated water vapor pressure $ec_0$ corresponding to the temperature $T_0$ and the saturated water vapor pressure $ec_1$ corresponding to the temperature $T_1$, which can be looked up from a saturated water vapor pressure-temperature comparison table;

$U_b = ec_0/ec_1 * U_0 + a$, where $a$ is 1-10%; and when the current detected relative humidity is smaller than or equal to the target humidity $U_b$, the drying step is stopped, and at this time, the waste in the disposal drum is already situated at a drying state and the control unit is determined to have completed the temperature maintaining stage and switched to the cooling stage.

2. The capacity expansion method for household food waste disposers according to claim 1, wherein in the detecting step, the original volume of the food waste in the disposal drum is reduced to 25% of the original volume after the household food waste disposer has completed the initial warming stage;

in the waste addition step, while continuously running the treatment routine, the control unit cyclically executes the determination and reminder step and the waste addition step to provide the user a plurality of timing and reminders to add the food waste; and the heating element comprises a heating plate installed at the bottom of the disposal drum, and the lid is installed at the top of the disposal drum.

3. The capacity expansion method for household food waste disposers according to claim 1, wherein in the detecting step, the temperature and humidity detection point is located at the food waste disposer and in a collection chamber or an air duct of the food waste disposer for exhausting airflow; and the control unit calculates and obtains the temperature rise rate according to the temperature detected at the temperature and humidity detection point and the detected time interval;

when the temperature rise rate is greater than 2° C. in three minutes, it is determined that the household food waste disposer has not completed the initial warming stage, the treatment routine continues running, and the control unit continues recording the temperature and calculates the temperature rise rate; and when the temperature rise rate is smaller than or equal to 2° C., it is determined that the household food waste disposer has completed the initial warming stage, and the control unit sends out the waste addition reminder.

4. The capacity expansion method for household food waste disposers according to claim 1, wherein when the control unit determines that the evaporation stage is completed and switched to the drying stage, the control unit sends out the waste addition reminder signal again and at the same time executes the waste addition step, and the audible/visual reminder is provided to remind the user to open the lid and add the food waste to the disposal drum again.

5. The capacity expansion method for household food waste disposers according to claim 4, wherein the household food waste disposer comprises a plurality of indicator lamps corresponding to the initial warming stage, the evaporation stage, the drying stage, the temperature maintaining stage and the cooling stage respectively;

the indication method of the indicator lamps comprises:
1) A lighting or blinking of the indicator lamps controlled by the control unit, which indicates the completed treatment stage,
2) A lighting or blinking of the indicator lamps controlled by the control unit which indicates the current treatment stage, and
3) A plurality of corresponding colors of the lighting or blinking of the indicator lamps controlled by the control unit, which is used to remind the user to open the lid and add the food waste to the disposal drum again.

6. The capacity expansion method for household food waste disposers according to claim 1, wherein after the treatment routine starts running and entering the initial warming stage, the initial warming stage is the stage when the heating element starts heating the disposal drum, and the initial warming stage comprises the process of starting to heat the bottom of the disposal drum to rise the temperature from room temperature, until water is released from the food waste, and then the liquid temperature at the bottom of the disposal drum rises to the highest level or even to a boiling point;

the evaporation stage is the stage where the liquid at the bottom of the disposal drum is stabilized at the highest temperature or situated in a boiling state, and after the inside of the disposal drum has reached a state of thermal equilibrium, it is determined that the control unit has completed the initial warming stage and entered the evaporation stage;

the drying stage is the stage where the liquid at the bottom of the disposal drum has been evaporated, and when the detected humidity is smaller than or equal to 50-60%, it is determined that the control unit has completed the evaporation stage and entered the drying stage;

the temperature maintaining stage is the stage where the water content of the food waste in the disposal drum has dropped very low, and when the temperature detected at the temperature and humidity detection point in the evaporation stage is greater than 75° C., it is determined that the control unit has completed the drying stage and entered the temperature maintaining stage; and the cooling stage is the stage of cooling, and when the currently detected relative humidity is smaller than or equal to the target humidity $U_b$, it is determined that the control unit has completed the drying stage and entered the cooling stage.

7. The capacity expansion method for household food waste disposers according to claim 6, wherein in the initial warming stage, the control unit executes the initial warming subroutine; the control unit after being activated controls the heating element to heat continuously to 150° C., and then controls the heating element to heat intermittently, the heating element continues heating when the temperature of the heating element is lower than 150° C., and the heating element stops heating when the temperature of the heating element is higher than 165° C., so as to control the temperature of the heating element within a range of 150-165° C.;

the control unit executes the evaporation subroutine in the evaporation stage, after entering the evaporation stage, the control unit continues controlling the heating element to heat intermittently, and controls the temperature of the heating element within the range of 150-165° C.;

the control unit executes the drying subroutine in the drying stage, after entering the drying stage, the control unit continues controlling the heating element to heat intermittently, the heating element continues heating when the temperature of the heating element is lower than 130° C., the heating element stops heating when the temperature of the heating element is higher than 145° C., so as to control the temperature of the heating element within a range of 130-145° C.;

the control unit executes the temperature maintaining subroutine in the temperature maintaining stage, after entering the temperature maintaining stage, the control unit continues controlling the heating element to heat intermittently, starts heating intermittently when the temperature at the temperature and humidity detection point is lower than 65° C. and stops heating when the temperature at the temperature and humidity detection point reaches 75° C.; and the control unit executes the cooling subroutine in the cooling stage; after entering the cooling stage, the control unit controls the heating element to stop heating and shut down after a countdown.

8. The capacity expansion method for household food waste disposers according to claim 1, wherein the target humidity $U_b$ is calculated after the currently detected current relative humidity $U_1$ is lower than 60% and the currently detected temperature $T_1$ is substantially stable.

* * * * *